US010025500B2

(12) United States Patent
Caine et al.

(10) Patent No.: US 10,025,500 B2
(45) Date of Patent: Jul. 17, 2018

(54) SYSTEMS AND METHODS OF USING INPUT EVENTS ON ELECTRONIC DEVICES

(75) Inventors: Allan David Caine, Waterloo (CA); Sumanan Jeyabalasingam, Waterloo (CA); Michael Elizarov, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 192 days.

(21) Appl. No.: 13/635,298

(22) PCT Filed: Oct. 28, 2011

(86) PCT No.: PCT/CA2011/050678
§ 371 (c)(1),
(2), (4) Date: Sep. 14, 2012

(87) PCT Pub. No.: WO2013/059905
PCT Pub. Date: May 2, 2013

(65) Prior Publication Data
US 2013/0167063 A1    Jun. 27, 2013

(51) Int. Cl.
*G06F 3/0488*    (2013.01)
*G06F 3/041*    (2006.01)
(Continued)

(52) U.S. Cl.
CPC .......... *G06F 3/04886* (2013.01); *G06F 3/038* (2013.01); *G06F 3/0416* (2013.01); *G06F 3/0481* (2013.01); *G06F 9/542* (2013.01)

(58) Field of Classification Search
CPC ............. G06F 3/04883; G06F 3/04886; G06F 3/0481; G06F 3/0416; G06F 3/038; G06F 9/542
(Continued)

(56) References Cited

U.S. PATENT DOCUMENTS 7,383,553 B2    6/2008    Atkin et al.
2003/0074647 A1    4/2003    Andrew
(Continued)

FOREIGN PATENT DOCUMENTS

EP    1540542 B1    8/2011

OTHER PUBLICATIONS

Miller, Ross; Graffiti for Android scribbles Palm OS memories all over Google's platform; http://www.engadget.com/2010/07/16/graffiti-for-android-scribbles-palm-os-memories-all-over-google/; available on the Internet as early as Jul. 16, 2010; retrieved form the Internet on Jun. 30, 2011.
(Continued)

*Primary Examiner* — Roland J Casillas
(74) *Attorney, Agent, or Firm* — Thomas Grzesik; Fleit Gibbons Gutman Bongini & Bianco P.L.

(57) ABSTRACT

A method and system are provided for using input events on an electronic device. The method includes detecting a first input event compatible with a first platform and determining a second input event representing the first input event, which is compatible with a second platform. The method may include determining a third input event representing the first input event, which is compatible with the second platform, and calling an input event handler compatible with the second platform to generate the second input event using the third input event.

11 Claims, 9 Drawing Sheets

(51) Int. Cl.
*G06F 3/038* (2013.01)
*G06F 3/0481* (2013.01)
*G06F 9/54* (2006.01)

(58) Field of Classification Search
USPC ......... 715/764, 771, 773, 748–749; 717/134, 717/138
See application file for complete search history.

(56) References Cited

U.S. PATENT DOCUMENTS

| | | | | |
|---|---|---|---|---|
| 2004/0044422 | A1* | 3/2004 | Fux | G06F 3/018 700/17 |
| 2005/0097570 | A1* | 5/2005 | Bomers | G06F 9/545 719/318 |
| 2006/0248541 | A1* | 11/2006 | Kanevsky | G06F 9/4411 719/321 |
| 2008/0276259 | A1 | 11/2008 | Kristell et al. | |
| 2012/0242579 | A1* | 9/2012 | Chua | G06F 3/04883 345/168 |
| 2012/0297294 | A1* | 11/2012 | Scott et al. | 715/261 |
| 2013/0132856 | A1* | 5/2013 | Binyamin | G06F 3/017 715/740 |

OTHER PUBLICATIONS

Graffiti® The Original Text Input App for Mobile; https://market.android.com/details?id=com.access_company.graffiti &feature=search_result; available on the Internet as early as Jan. 13, 2011; retrieved from the Internet on Jun. 30, 2011.

Graffiti® ; Mobile Apps for Android, iOS, iPhone, iPad; http://www.access-company.com/cgi/nflife.cgi? a=app&aname=graffiti; available on the Internet as early as Aug. 26, 2010; retrieved from the Internet on Jun. 30, 2011.

Huang, Ning; International Search Report from corresponding PCT Application No. PCT/CA2011/050678; search completed on Jun. 6, 2012.

Extended European Search Report dated May 8, 2015 for European Application No. 11874743.5.

Canadian Office dated Jul. 20, 2017 received for Canadian Application No. 2,853,553.

* cited by examiner

SYSTEMS AND METHODS OF USING INPUT EVENTS ON ELECTRONIC DEVICES

TECHNICAL FIELD

The following relates generally to using one or more input events on electronic devices.

BACKGROUND

Electronic devices, including mobile devices, provide various input methods to allow a user to interact with the electronic devices. Generally, an input method is a software component or application that allows data to be inputted to an electronic device. Example forms of input data may include or represent keyboard strokes, cursor movements, or touch events on a touch-sensitive display. For example, an input method can provide as input to the electronic device the character corresponding to a key selected by the user on a physical or virtual keyboard of an electronic device. In another example, an input method can provide as an input to the electronic device a suggested word based on one or more keys previously selected by the user (i.e. predictive typing).

BRIEF DESCRIPTION OF THE DRAWINGS

Example embodiments will now be described by way of example only with reference to the appended drawings wherein.

DETAILED DESCRIPTION

Figure 1:
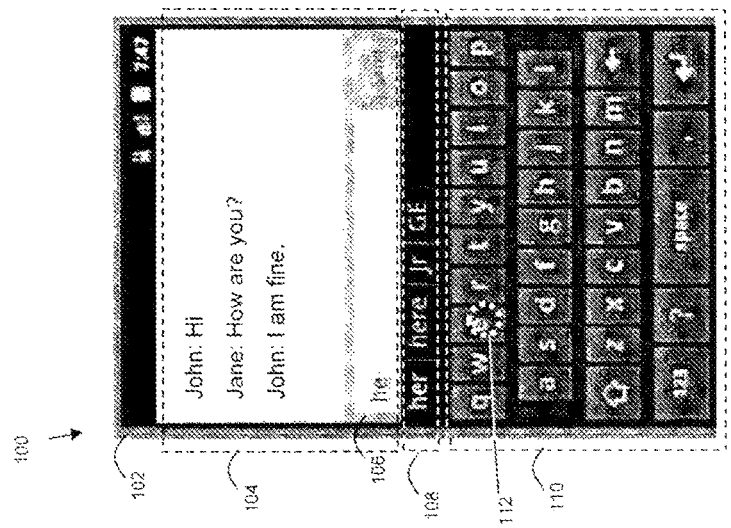
FIG. 1 is a block diagram of an example of a display of a mobile device illustrating an input method

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details, in other instances, well-known methods, procedures and components have not been described in detail so as not to obscure the example embodiments described herein. Also, the description is not to be considered as limiting the scope of the example embodiments described herein.

Many electronic devices provide simple input methods with limited functionality. For example, a physical keyboard can provide a one to one correspondence between a key pressed and a character generated on the electronic device. Electronic devices can also provide input methods with increased functionality to improve the user interface. For example, input methods can provide features such as spell check, automatic formatting, automatic correction, support for multiple languages, etc.

In an example, a physical or virtual keyboard may provide a reduced number of keys, for portability. Such a keyboard may use a "multi-tap" input method such that one key can be used to input multiple characters. The repeated pressing of the same key can cycle through a list of possible characters associated with that key. In order to minimize the number of key presses required, an improved input method can predict the character associated with a single key press based on the previous characters selected (such as T9 text prediction).

In another example, many electronic devices that are mobile or portable (referred to herein as mobile devices), such as smart phones, provide a physical or virtual keyboard with a small form factor. However, a small keyboard may increase the likelihood that a key nearby the intended key is pressed accidentally instead. Similarly, it may be difficult to select the intended key using a virtual keyboard as it provides little or no tactile feedback as to which key has been selected. An input method may be provided to predict an intended key based on the selected key to automatically correct a key selection error. This can avoid the reed for a user to explicitly delete the unintended input and to re-select the intended key.

With the increasing number and variety of mobile devices, input methods may be developed for a specific operating system of the mobile device, developed on a specific programming language platform and/or developed to exploit a feature unique of a particular manufacturer or model of a mobile device. As a result, an input method developed for one mobile device may be incompatible with another mobile device.

It has been recognized that input methods developed for an electronic device such as a mobile device may be incompatible with a different electronic device. To address this, the following describes a method, computer readable storage medium and a device operable to use input events on an electronic device. The method includes detecting a first input event compatible with a first platform, and determining a second input event representing the first input event, which is compatible with a second platform. The method may include determining a third input event representing the first input event, which is compatible with the second platform, and calling an input event handler compatible with the second platform to generate the second input event using the third input event.

In some example embodiments, the method includes calling at least one input method compatible with the second platform to generate an input method event based on the second input event, and determining one or more instructions compatible with the first platform based on the input method event. Calling at least one input method may include applying the second input event to a plurality of input methods in series. At least one input method may use probability information to generate the input method event.

In some example embodiments, the first input event and second input event represent inputs on a touch-sensitive display. The second input event may include probability information.

In some example embodiments, a mediator module interfacing between the first platform and the second platform is used for any one or more of the following: determining the second input event, determining the third input event, calling the input event handler, calling at least one input method and determining one or more instructions.

Referring to FIG. 1, a schematic diagram of a display 102 of a mobile device 100 displaying an messaging application window 104 is provided. In this example embodiment, the display is a touch-sensitive display 102 displaying a virtual keyboard 110. The messaging application window 104 includes a text entry box 106 for displaying the keys selected by a user touch 112, as detected by the virtual keyboard 110. In this example, the mobile device 100 is operable to use an input method that suggests one or more combinations of characters 108 in response to the key selections detected by the virtual keyboard 110. In this example, the input method suggests additional characters based on the keys detected as well as one or more combinations of characters in close proximity to the keys detected to consider the possibility that a user pressed an incorrect key.

In one example, a mobile device 100 generates an input event in response to detecting a user input such as a user touch 112 on the touch-sensitive display 102. The input event describes the user input in a predetermined format that can be understood by an input method. For example, the input event can be an object having an x-coordinate field and y-coordinate field to describe the position of the touch 112 on the touch-sensitive display 102. The input method can then be applied to the input event to generate an input method event. The input method event includes one or more instructions to be performed by the mobile device 100 according to the input method. In the example of FIG. 1, the input method event can include instructions to display one or more suggested characters 108.

It can be appreciated that input events generated by mobile devices running different operating systems can have different formats. Accordingly, a first input method designed for a first operating system and that supports input events of a first format may not function properly on a second operating system having input events of a second format because the first input method may not understand the second format of the second operating system. In an example embodiment, a first input event having a first format not directly supported by an input method can be converted into a second input event having a second format that is understood by the input method. It can therefore be seen that an input method not directly compatible with the input events of an operating system of a mobile device 100 can still be used by that mobile device 100. In another example, an input method event that is generated from an input method not designed for the operating system of the mobile device 100 may not be able to directly instruct the operating system or an application running on the operating system. In an example embodiment, the instructions of an input method event can be translated into instructions that are understood by the operating system. Therefore it can be seen that an input method developed for a particular operating system can be operable in another operating system that was non-existent or was otherwise incompatible at the time of developing the input method. This can also increase the re-use of programming code of an input method when porting the input method to a different platform.

Examples of applicable mobile devices may include, without limitation, cellular phones, smart-phones, tablet computers, wireless organizers, personal digital assistants, computers, laptops, handheld wireless communication devices, wirelessly enabled notebook computers, portable gaming devices, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, wall-mounted screens such as kiosks, or any other computing device.

In an example embodiment, the mobile device 100 can be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
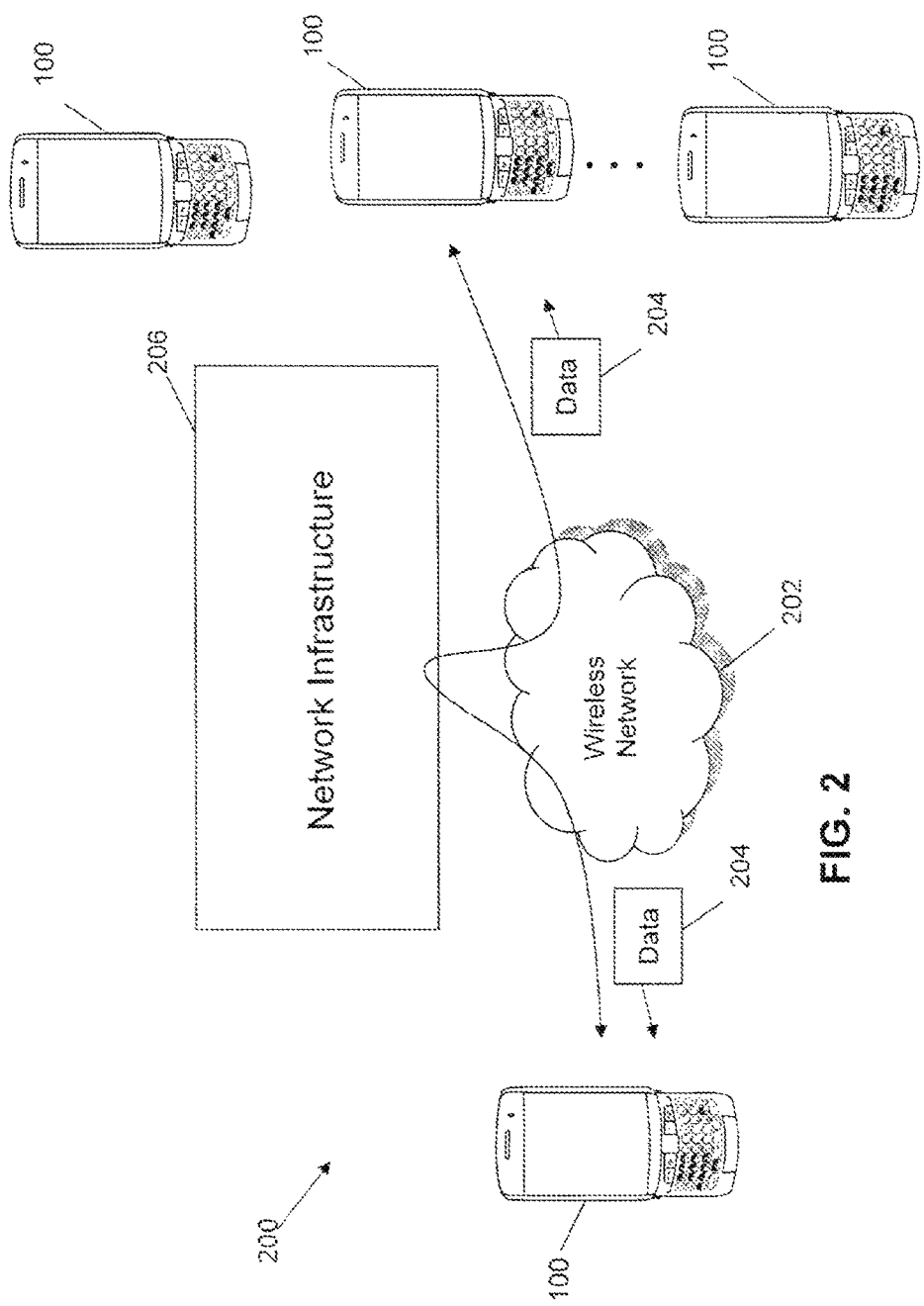
FIG. 2 is a block diagram of an example of a wireless communication system.

Referring to FIG. 2, an example communication system 200 is shown. The communication system 200, in this example, enables, at least in part, mobile devices 100 to communicate with each other via a wireless network 202. For example, as shown, data 204 may be exchanged between various mobile devices 100. Data 204 that is sent from one mobile device 100 to another mobile device 100 may be transmitted according to a particular messaging or communication medium, protocol, or other mechanism. For example, as shown in FIG. 2, data 204 may be sent over the wireless network 202 via a component of a network infrastructure 206. The network infrastructure 206 can include various systems that may be used by the mobile devices 100 to exchange data 204. For example, a peer-to-peer (P2P) system, a short message service centre (SMSC), an email system (e.g. web-based, enterprise based, or otherwise), a web system (e.g. hosting a website or web service), a host system (e.g. enterprise server), and social networking system may be provided by or within or be otherwise supported or facilitated by the network infrastructure 206. The mobile devices 100 may therefore send data to or receive data from other mobile devices 100 via one or more particular systems with which the mobile devices 100 are communicable via the wireless network 202 and network infrastructure 206.

Figure 3:
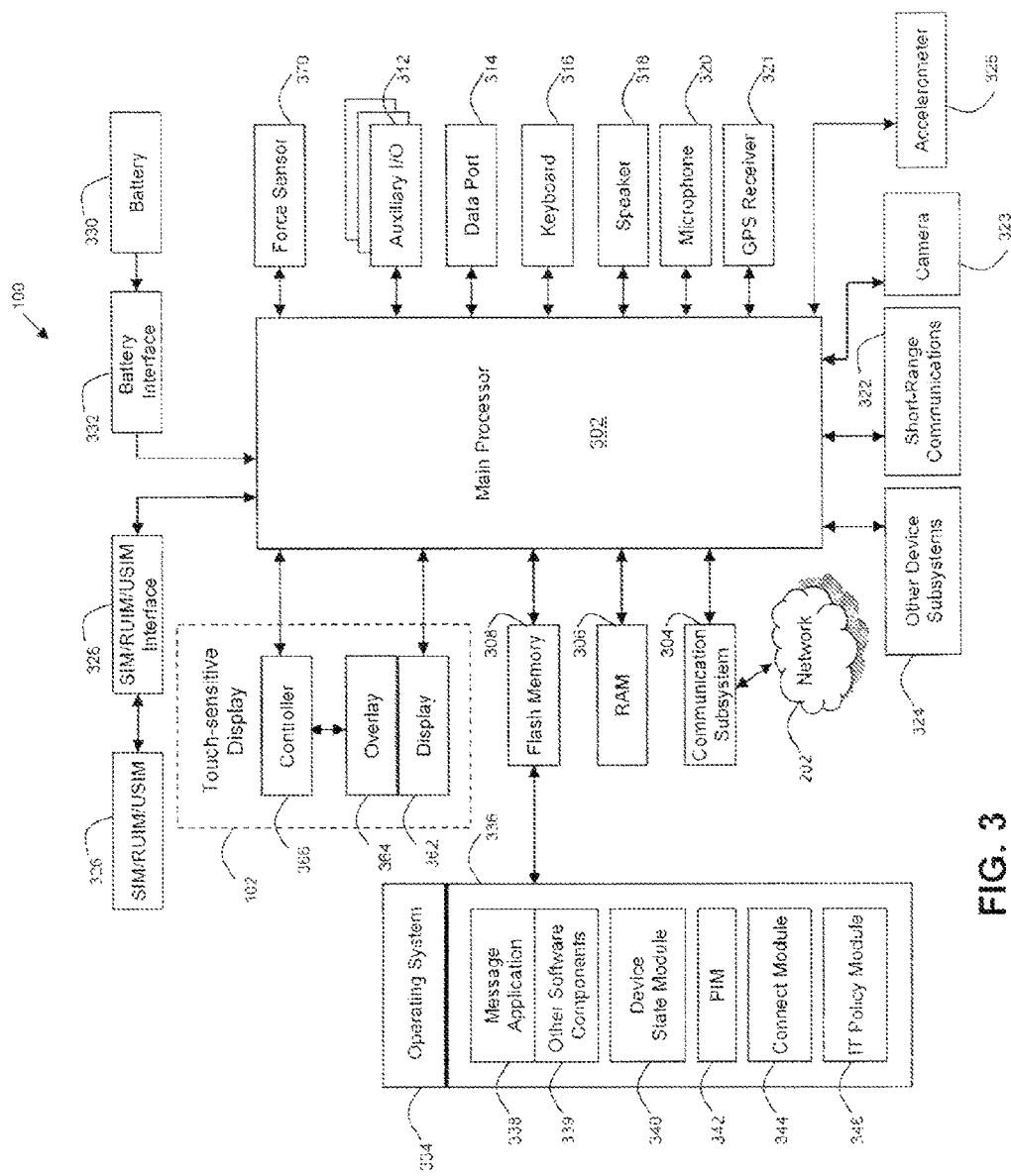
FIG. 3 is a block diagram of an example embodiment of an electronic device.

Referring to FIG. 3, a block diagram of an example embodiment of an electronic device is provided. The mobile device 100 includes a number of components such as a main processor 302 that controls the overall operation of the mobile device 100. Communication functions, including data and voice communications, are performed through a communication subsystem 304. The communication subsystem 304 receives messages from and sends messages to a wireless network 202. In this example embodiment of the mobile device 100, the communication subsystem 304 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 304 with the wireless network 202 represents one or, more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 102, an auxiliary input/output (I/O) subsystem 312, a data port 314, a keyboard 316, a speaker 318, a microphone 320, a GPS receiver 321, short-range communications 322, a camera 323, a accelerometer 325 and other device subsystems 324. Some of the subsystems of the mobile device 100 perform communication-related functions, whereas other subsystems may provide "resident" or on-device functions. By way of example, the display 362 and the keyboard 316 may be used for both communication-related functions, such as entering a text message for transmission over the network 202, and device-resident functions such as a calculator or task list. In an example embodiment, the mobile device 100 can include a non touch-sensitive display in place of, or in addition to, the touch-sensitive display 102. For example the touch-sensitive display 102 can be replaced by a display 362 that may not have touch-sensitive capabilities.

The mobile device 100 can send and receive communication signals over the wireless network 202 after required network registration or activation procedures have been completed. Network access is associated with a subscriber or user of the mobile device 100. To identify a subscriber, the mobile device 100 may use a subscriber module component or "smart card" 326, such as a Subscriber Identity Module (SIM), a Removable User Identity Module (RUIM) and a Universal Subscriber Identity Module (USIM). In the example embodiment shown, a SIM/RUIM/USIM 326 is to be inserted into a SIM/RUIM/USIM interface 328 in order to communicate with a network. Without the component 326, the mobile device 100 is not fully operational for communication with the wireless network 202. Once the SIM/RUIM/USIM 326 is inserted into the SIM/RUIM/USIM interface 328, it is coupled to the main processor 302.

The mobile device 100 is typically a battery-powered device and includes a battery interface 332 for receiving one or more rechargeable batteries 330. In at least some example embodiments, the battery 330 can be a smart battery with an embedded microprocessor. The battery interface 332 is coupled to a regulator (not shown), which assists the battery 330 in providing power to the mobile device 100. Although current technology makes use of a battery, future technologies such as micro fuel cells may provide the power to the mobile device 100.

The mobile device 100 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 100 during its manufacture. Software applications may include a message application 338, a device state module 340, a Personal Information Manager (PIM) 342, a connect module 344 and an IT policy module 346. A message application 338 can be any suitable software program that allows a user of the mobile device 100 to send and receive electronic messages, wherein messages are typically stored in the flash memory 308 of the mobile device 100. A device state module 340 provides persistence, i.e. the device state module 340 ensures that important device data is stored in persistent memory, such as the flash memory 308, so that the data is not lost when the mobile device 100 is turned off or loses power. A PIM 342 includes functionality for organizing and managing data items of interest to the user, such as, but not limited to, e-mail, contacts, calendar events, and voice mails, and may interact with the wireless network 202. A connect module 344 implements the communication protocols that are required for the mobile device 100 to communicate with the wireless infrastructure and any host system, such as an enterprise system, that the mobile device 100 is authorized to interface with. An IT policy module 346 receives IT policy data that encodes the IT policy, and may be responsible for organizing and securing rules such as the "Set Maximum Password Attempts" IT policy.

Other types of software applications or components 339 can also be installed on the mobile device 100. These software applications 339 can be pre-installed applications (i.e., other than message application 338) or third party applications, which are added after the manufacture of the mobile device 100. Examples of third party applications include games, calculators utilities, etc.

The additional applications 339 can be loaded onto the mobile device 100 through at least one of the wireless network 202, the auxiliary I/O subsystem 312, the data port 314, the short-range communications subsystem 322, or any other suitable device subsystem 324.

The data port 314 can be any suitable port that enables data communication between the mobile device 100 and another computing device. The data port 314 can be a serial or a parallel port. In some instances, the data port 314 can be a USB port that includes data lines for data transfer and a supply line that can provide a charging current to charge the battery 330 of the mobile device 100.

For voice communications, received signals are output to the speaker 318, and signals for transmission are generated by the microphone 320. Although voice or audio signal output is accomplished primarily through the speaker 318, the display 362 can also be used to provide additional information such as the identity of a calling party, duration of a voice call, or other voice call related information.

The touch-sensitive display 102 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 102 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 362 of the touch-sensitive display 102 may include a display area in which information may be displayed, and a non-display area extending around the periphery of the display area information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 102. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 102. The location of the touch moves as the detected object moves during a touch. The controller 366 and/or the processor 302 may detect a touch by any suitable contact member on the touch-sensitive display 102. Similarly, multiple simultaneous touches, are detected.

One or more gestures are also detected by the touch-sensitive display 102. A gesture is a particular type of touch on a touch-sensitive display 102 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically includes an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically includes an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 370 or force sensors is disposed in any suitable location, for example, between the touch-sensitive display 102 and a back of the mobile device 100 to detect a force imparted by a touch on the touch-sensitive display 102. The force sensor 370 may be a force-sensitive resistor, strain gauge, piezo-electric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 4:
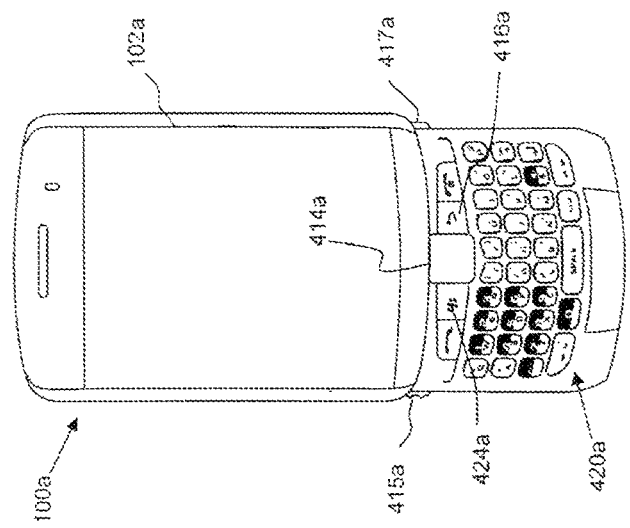
FIG. 4 is a plan view of an example of a mobile device.
Figure 5:
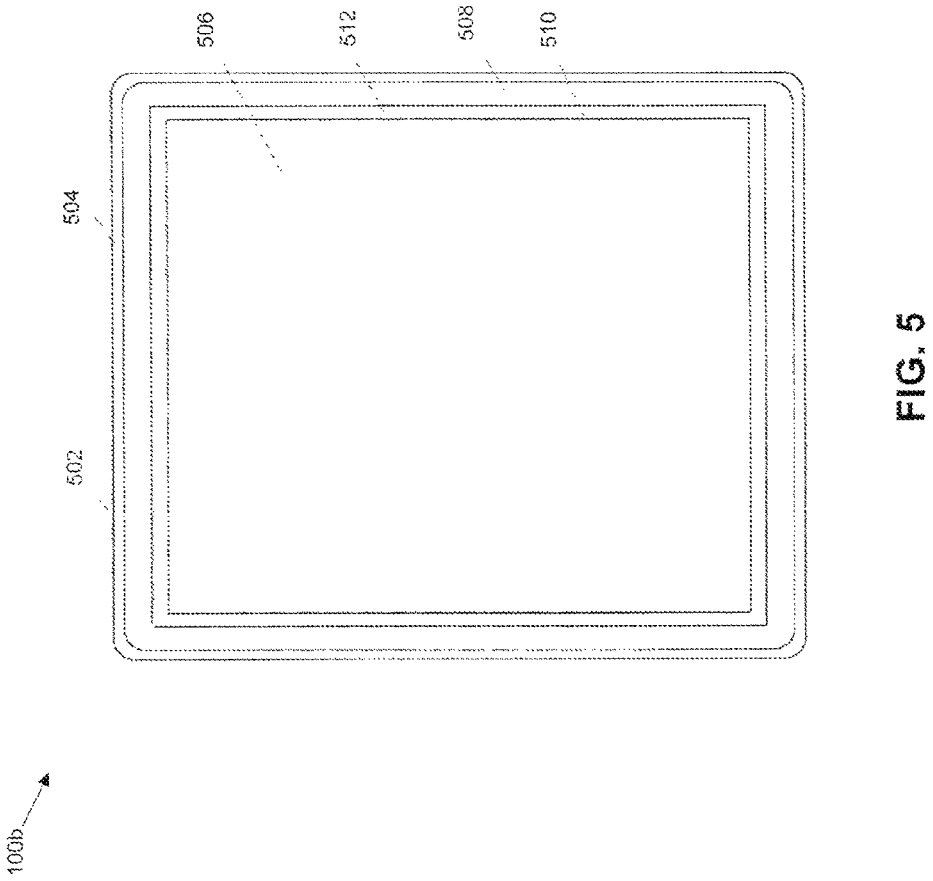
FIG. 5 is a plan view of another example of a mobile device.

Referring to FIGS. 4 and 5, one example of a mobile device 100a is shown in FIG. 4 and another example of a mobile device 100E) is shown in FIG. 5. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all figures.

The mobile device 100a shown in FIG. 4 includes a touch-sensitive display 102a and a cursor or positioning device, which in this example is in the form of a trackpad 414a. The trackpad 414a permits multi-directional positioning of a selection indicator or cursor that can be displayed on the touch-sensitive display area 102a such that the selection cursor can be moved in upward, downward, leftward and rightward directions and, if desired and/or permitted, in various other directions such as a diagonal direction. A selection cursor may include a box, alteration of an icon or any combination of features that enable the user to identify the currently chosen icon or item. The trackpad 414a in this example embodiment is situated on the front face of a housing for mobile device 100a to enable a user to manoeuvre the trackpad 414a while holding the mobile device 100a in one hand. The trackpad 414a may serve as another input member (in addition to a directional or positioning member) to provide selection inputs to a processor of the mobile device and can preferably be pressed in a direction towards the housing of the mobile device 100a to provide such a selection input. It will be appreciated that the trackpad 414a is only one example embodiment of a suitable positioning device. For example, a trackball, touch-sensitive display area OLED, or other input mechanism may equally apply.

The mobile device 100a in FIG. 4 also includes a programmable convenience button 415a to activate a selection application such as, for example, a calendar or calculator.

Further, mobile device 100a also includes an escape or cancel button 416a, a camera button 417a, a menu or option button 424a and a keyboard 420a. The camera button 417a is able to activate photo and video capturing functions, e.g. when pressed in a direction towards the housing. The menu or option button 424a can be used to load a menu or list of options on the display 102a when pressed. In this example, the escape or cancel button 416a, the menu option button 424a, and a keyboard 420a are disposed on the front face of the mobile device housing, while the convenience button 415a and camera button 417a are disposed at the side of the housing. This button placement enables a user to operate these buttons while holding the mobile device 100a in one hand. The keyboard 420a is, in this example embodiment, a standard QWERTY keyboard, however, it will be appreciated that reduced QWERTY or virtual keyboards (e.g. as provided by a touch-sensitive display area) may equally apply.

It will be appreciated that for the mobile device 100, a wide range of one or more positioning or cursor/view positioning mechanisms such as a touch/track pad, a positioning wheel, a joystick button, a mouse, a touch-screen, a set of arrow keys, a tablet, an accelerometer (for sensing orientation and/or movements of the mobile device 100 etc.), OLED, or other whether presently known or unknown may be employed. Similarly, any variation of keyboard 420a may be used. Other buttons may also be disposed on the mobile device housing such as colour coded "Answer" and "Ignore" buttons to be used in telephonic communications.

A front view of an example of the mobile device 100b is shown in FIG. 5. The mobile device 100b includes a housing 502 that encloses components such as shown in FIG. 3. The housing 502 may include a back, sidewalls, and a front 504 that frames the touch-sensitive display 102. The example mobile device 100b shown in FIG. 5 can represent a portable tablet computer or device.

In the shown example of FIG. 5, the touch-sensitive display 102 is generally centered in the housing 502 such that a display area 506 of the touch-sensitive overlay 364 is generally centered with respect to the front 504 of the housing 502. The non-display area 508 of the touch-sensitive overlay 364 extends around the display area 506. In the presently described example embodiment, the width of the non-display area is 4 mm.

For the purpose of the present example, the touch-sensitive overlay 364 extends to cover the display area 506 and the non-display area 508. Touches on the display area 506 may be detected and, for example, may be associated with displayed selectable features. Touches on the non-display area 508 may be detected, for example, to detect a meta-navigation gesture. Alternatively, meta-navigation gestures may be determined by both the non-display area 508 and the display area 506. The density of touch sensors may differ from the display area 506 to the non-display area 508. For example, the density of nodes in a mutual capacitive touch-sensitive display, or density of locations at which electrodes of one layer cross over electrodes of another layer, may differ between the display area 506 and the non-display area 508.

Gestures received on the touch-sensitive display 102 may be analyzed based on the attributes to discriminate between meta-navigation gestures and other touches, or non-meta navigation gestures. Meta-navigation gestures may be identified when the gesture crosses over a boundary near a periphery of the display 362, such as a boundary 510 between the display area 506 and the non-display area 508.

In the example of FIG. 5, the origin point of a meta-navigation gesture may be determined utilizing the area of the touch-sensitive overlay 364 that covers the non-display area 508.

A buffer region 512 or band that extends around the boundary 510 between the display area 506 and the non-display area 508 may be utilized such that a meta-navigation gesture is identified when a touch has an origin point outside the boundary 510 and the buffer region 512 and crosses through the buffer region 512 and over the boundary 510 to a point inside the boundary 510. Although illustrated in FIG. 5, the buffer region 512 may not be visible. Instead, the buffer region 512 may be a region around the boundary 510 that extends a width that is equivalent to a predetermined number of pixels, for example. Alternatively, the boundary 510 may extend a predetermined number of touch sensors or may extend a predetermined distance from the display area 506. The boundary 510 may be a touch-sensitive region or may be a region in which touches are not detected.

Gestures that have an origin point in the buffer region 512, for example, may be identified as non-meta navigation gestures. Optionally, data from such gestures may be utilized by an application as a non-meta navigation gesture. Alternatively, data from such gestures may be discarded such that touches that have an origin point on the buffer region 512 are not utilized as input at the mobile device 100.

Figure 6:
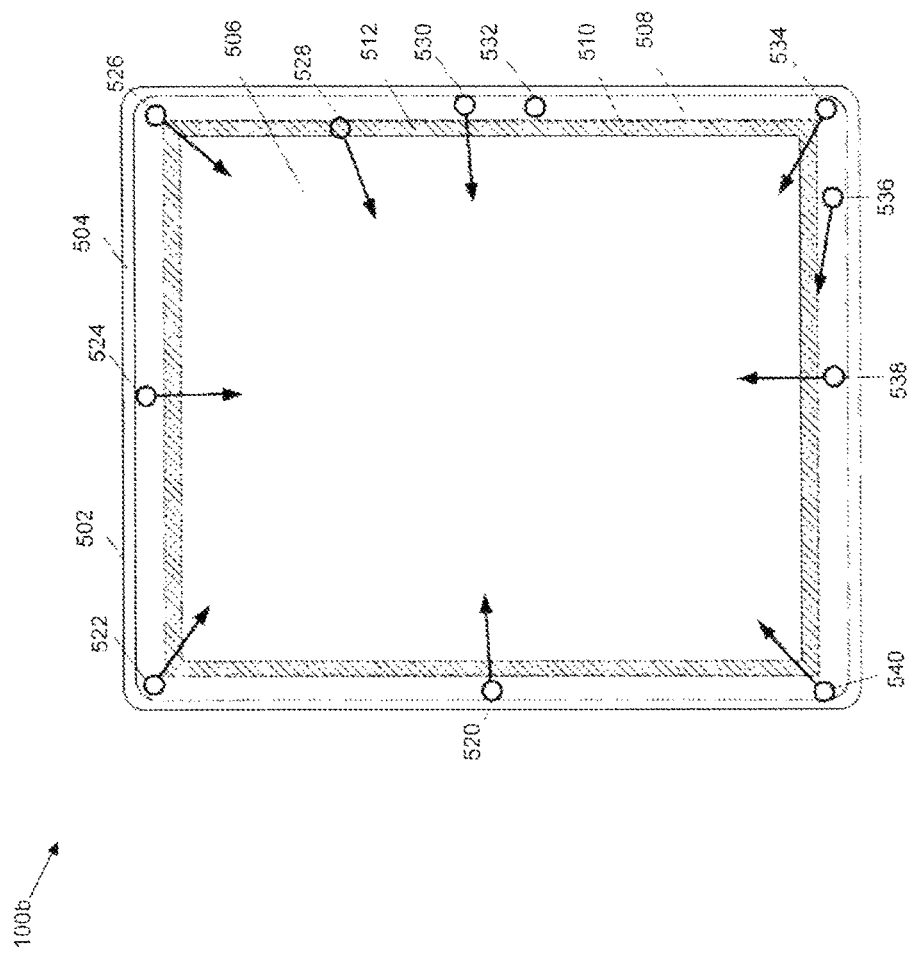
FIG. 6 is a plan view of examples of touches on the mobile device of FIG. 5

FIG. 6 illustrates examples of touches on the touch-sensitive display 102. The buffer region 512 is illustrated in FIG. 6 by hash markings for the purpose of explanation. As indicated, the buffer region 512 may not be visible to the user. For the purpose of explanation, touches are illustrated by circles at their points of origin. Arrows extending from the circles illustrate the paths of the touches that are gestures.

The touch 538 begins at the origin point outside the boundary 510 and outside the buffer region 512. The path of the touch 538 crosses the buffer region 512 and the boundary 510 and is therefore identified as a meta-navigation gesture. Similarly, the touches 520, 530, 524, 522, 526, 540, 534 each have origin points outside the boundary 510 and the buffer region 512 and their paths cross the buffer region 512 and the boundary 510. Each of the touches 520, 530, 524, 522, 526, 540, 534 is therefore identified as a meta-navigation gesture. The touch 528, however, has an origin point that falls within the buffer region 512 and the touch 528 is therefore not identified as a meta-navigation gesture. The touch 536 begins at an origin point outside the boundary 510 and the buffer region 512. The path of the touch 536, however, does not cross the boundary 510 and is therefore not identified as a meta-navigation gesture. The touch 532 also has an origin point outside the boundary 510 and the buffer region 512 but is not a gesture and therefore does not cross the boundary 510 and is not identified as a meta-navigation gesture.

It will be appreciated that the mobile devices 100 shown in FIGS. 4 and 5 are for illustrative purposes only and various other mobile devices 100 are equally applicable to the following example embodiments.

Figure 7:
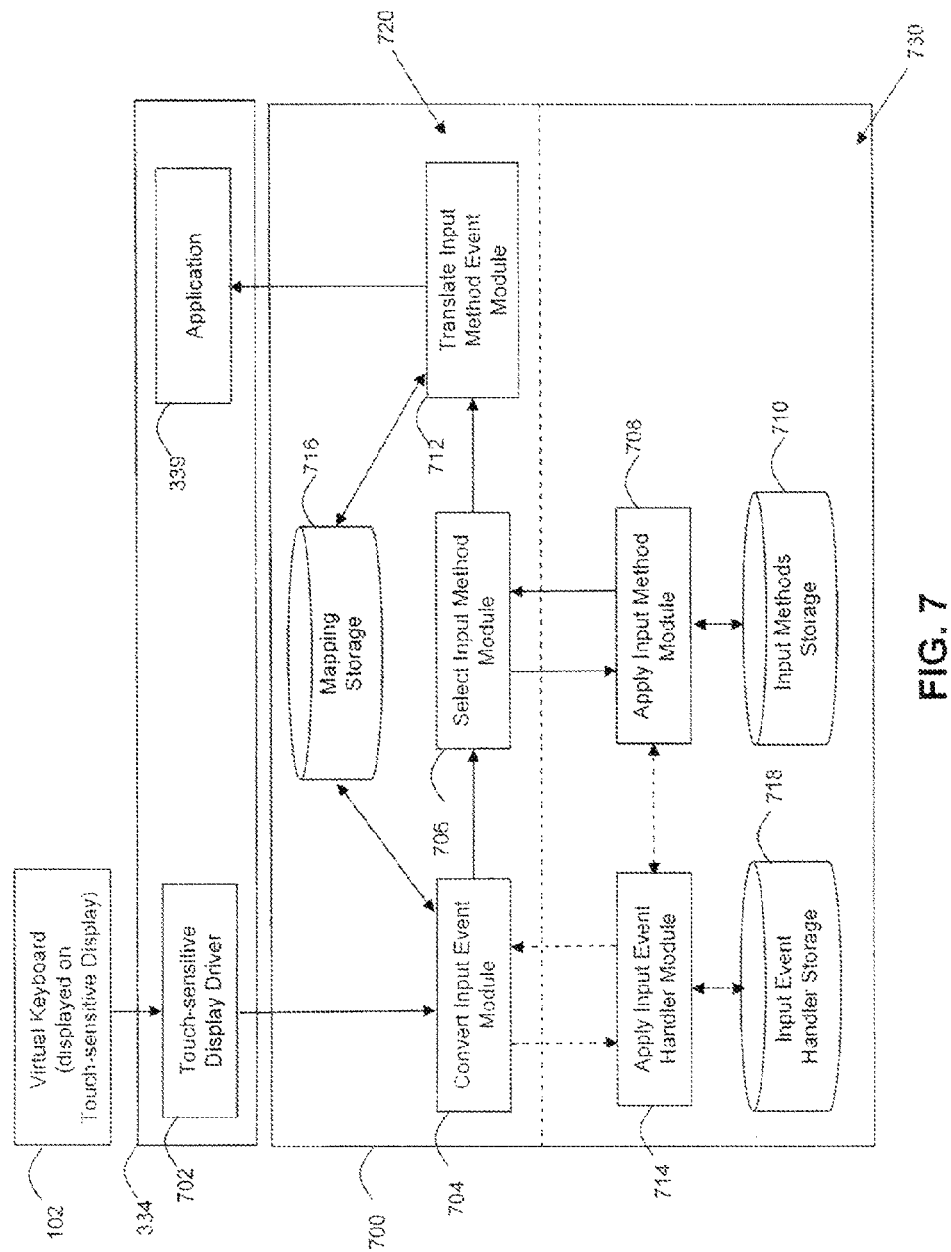
FIG. 7 is a block diagram of an example of a configuration of an input method application.

Referring to FIG. 7, an example configuration of the input method application 700 is provided. The input method application 700 can be one of the other software applications 339 of FIG. 3 that can be loaded on the mobile device 100 or an input method service of the operating system 334 to be used by other software applications 339. The input method application 700 can request details of activity occurring in, or receive inputs from, the operating system 334 in response to detecting a user input. In the example of FIG. 7, the operating system 334 can generate an input event via the touch-sensitive display driver 702 in response to detecting a user touch 112 on a virtual keyboard 110 (displayed on the touch-sensitive display 102). It can be appreciated that an input event can be generated in response to detecting a user input from other input components such as a physical keyboard 316 and other auxiliary I/O subsystems 312 via their respective software driver.

The input method application 700 in the example of FIG. 7 includes a convert input event module 704 for converting a first input event having a first format compatible with the operating system 334 to a second input event having a second format compatible with the input methods stored in the input methods storage 710. The input method application 700 also includes a select input method module 706 for selecting one or more input methods to apply to the second input event, an apply input method module 708 for applying one or more input methods to the second input event to generate an input method event, an input methods storage 710 for storing and retrieving one or more input methods, a translate input method event module 712 for translating an input method event into one or more instructions that can be understood by an application 334 running on the operating system 334, and a mapping storage 716 for storing mapping information used to convert a first input event to a second input event and to translate an input method event into instructions. In an example embodiment, the input method application 700 can also include an apply input event handler module 714 to be called by the convert input event module 704 to apply an input event handler to convert the first input event to a second input event using an input event handler stored in the input event handler storage 718. In another example embodiment, the apply input event handler module 714 can be called by the apply input method module 708 to further process the second input event prior to applying an input method.

In an example embodiment, the input method application 700 in the example of FIG. 7 can be divided into a mediation layer 720 and a proprietary layer 730. The mediation layer 720 of the input method application 700 manages the interaction between the operating system 334 and the proprietary layer 730 of the input method application 700. The mediation layer 720 includes the convert input event module 704, select input method module 706, translate input method event module 712 and the mapping storage 716.

The mediation layer 720 can serve as the interface for the operating system 334 to provide a first input event to be used by an input event handler and/or input method of the proprietary layer 730 that is not directly compatible with the operating system 334. The mediation layer also serves as an interface for the input methods to provide instructions from an input method event that can to be used by an application 339 running on the operating system 334.

The proprietary layer 730 includes the apply input event handler module 714, input event handler storage 718, apply input method module 708 and the input methods storage 710. The proprietary layer 730 includes one or more input methods and/or input event handlers that are not directly compatible with the operating system 334. For example, the input event handler and input methods in the proprietary layer 730 may be developed for a platform incompatible with the operating system 334 such as a different operating system.

As the mediation layer 720 can provide a distinctive boundary between the proprietary layer 730 and the operating system 334, the input method application 700 may be well suited for an operating system 334 utilizing an open-source framework. The input methods and input event handlers stored in the proprietary layer 730 may be less likely to be considered as part of the open-source framework of an operating system 334 as the operating system 334 may not have access, and may not have knowledge of the implementations of the input methods and input event handlers in the proprietary layer 730. Thus, it can be seen that the mediation layer 720 can be used to hide the input methods and input event handlers, which may be subject to patented technology or trade secrets.

The convert input event module 704 converts a first input event having a first format compatible with and provided by the operating system 334 into a second input event having a second format supported by one or more of the input event handlers and/or input methods in the proprietary layer 730. In an example embodiment, the convert input event module 704 may use mapping information stored in the mapping storage 716 to convert the first input event into a second input event and then send the second input event to the select input method module 706.

In an example embodiment, the convert input event module can convert the first input event by using one or more input event handlers stored in the proprietary layer 730. The input event handler may be compatible with the input methods stored in the proprietary layer 730 and thus, incompatible with the operating system 334. In an example, the convert input event module 704 converts the first input event into a third input event having the second format that is compatible with the proprietary layer 730 and calls the apply input event handler module 714 to apply an input event handler to the third input event to generate the second input event.

As noted above, the convert input event module 704 also serves as a boundary to the domain of the operating system 334. As noted above, in the example of an open source operating system, it may be useful to provide a clear boundary separating the operating system 334 from proprietary components so as to minimize the likelihood that the proprietary components will be considered as being part of the open-source framework.

The select input method module 706 receives the second input event and calls the apply input method module 708 to apply one or more input methods stored in the input methods storage 710 to the second input event to generate an input method event. The select input method module 706 then receives an input method event generated from the apply input method module 708 and sends the input method event to the translate input method event module 712.

The apply input method module 708 applies one or more input methods stored in the input methods storage 710 to the second input event to generate an input method event. In an example embodiment, the apply input method module 708 can apply one or more input methods in sequence to the second input event. Each input method generates a respective input method event. In this example, a first input method in the sequence is applied to the second input event to generate a first input method event. The second input method in the sequence can then be applied to the first input method event to generate the second input method event. Similarly, the next input method in the sequence is applied to the respective input method event generated by the preceding input method in the sequence until the sequence of input methods has been applied.

In another example embodiment, the apply input methods module 708 can call the apply input event hander module 714 to apply an input event handler on the second input event prior to applying one or more input methods.

The translate input method events module 712 receives an input method event in the second format that is incompatible with an application 339 running on the operating system 334 from the select input method module 706 and translates information in the input method event into one or more instructions that can be understood by the application 339. In an example embodiment, the translate input method event can access mapping information from the mapping storage 716.

In an example embodiment, the apply input event handler module 714 obtains a third input event from the convert input event module 704 and applies one or more input event handlers stored in the input event handler storage 718 to generate the second input event. In another example embodiment, the apply input event hander module 714 can obtain the second input event from the apply input method module, and apply one or more input event handlers to the second input event prior to applying the second input event to one or more input methods.

An input event handler may improve the usefulness of an input method by incorporating additional information that can be exploited by the input method, but is not otherwise provided by the first input event. A first input event that is developed for a first platform may not be aware of the features and/or requirements of an input event of the second platform.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 8:
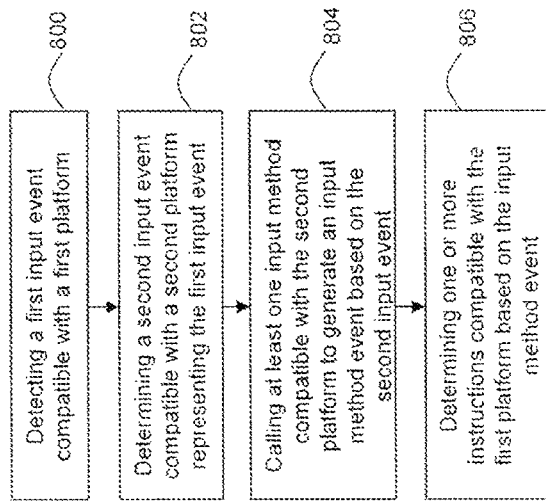
FIG. 8 is a flow diagram of example computer executable instructions for using an input event on an electronic device.

Referring to FIG. 8, an example set of computer executable or processor implemented instructions is provided for using an input event on an electronic device such as a mobile device 100. At block 800, a first input event compatible with a first platform is detected. For example, the first input event can be generated by the operating system 334 in response to a touch 112 on a virtual keyboard 110 displayed on a touch-sensitive display 102. At block 802, a second input event compatible with a second platform representing the first input event is determined. In an example embodiment, a mediator module is used to determine the second input event. At block 804, at least one input method operable on the second platform is called to generate an input method event based on the second input event. In an example embodiment, the mediator module is used to call one or more input methods. At block 806, one or more instructions compatible with the first platform is determined based on the input method event. In an example embodiment, the mediator module translates the instructions in the input method event of the second platform into instructions that can be performed on the first platform.

As noted above, a first input event is generated on a first platform at block 800. In an example configuration of the input method application 700 (FIG. 7), the first input event can be generated by the touch-sensitive display driver 702 loaded on the operating system 334 in response to a user touch 112 on a virtual keyboard displayed on the touch-sensitive display 102. The first input event can be generated according to a predetermined format understood by the operating system 334 such that the first input event is compatibility with a first platform (i.e. the operating system 334 of the mobile device 100). It can be appreciated that the first input event can be generated in response to a user input using any one of the input mechanisms of a mobile device 100 such as a trackpad, physical keyboard, microphone, etc., via a software driver of the respective input mechanism.

At block 802, a second input event representing the first input event is determined. In an example embodiment, the second input event is compatible with a second platform. The second platform can differ from the first platform by any one or more of being different operating systems, using different programming languages and using different data structures, for example. In an example configuration, block 802 may be implemented by the convert input event module 704 (FIG. 7).

In an example, the operating system 334 of the mobile device 100 may incorporate object-oriented programming to define the first input event as an object including an x-coordinate field and y-coordinate field to describe the position of a user touch 112 on the touch-sensitive display 102 and a key field to describe the closest key of the virtual keyboard displayed at that position. The second input event may also represent a touch input as an object with an x-coordinate field, a y-coordinate field, and a key field. In an example embodiment, the second input event is determined by setting one or more data fields of the second input event to the value of the corresponding fields in the first input event (e.g., the x-coordinate, y-coordinate and key fields). In another example, the second input event may derive one or more of its data fields from one or more of the data fields of the first input event. For example, the second input event may use a different coordinate system (e.g., a different origin and/or axis are normalized) such the x-coordinate field and y-coordinate field may be derived from the respective values in the first input event. It can be understood that the first and second input events can include information regarding any one or more properties associated with a user input. It can also be appreciated that data fields in the first input event may not have a corresponding data field in the second input event in which cause a data field of the first input event may be ignored. Mapping information between data fields of the first input event and second input event can be stored in a mapping storage 716 in the example configuration of FIG. 7 and be accessed by the convert input event module 704 to determine the second input event representing the first input event.

In another example embodiment, the second input event may include additional information not present in the first input event. For example, the second input event corresponding to the user touch 112 can also include probabilistic information regarding whether the key selected by the touch 112 is the intended key selected by the user. The probabilistic information can include a probability value associated with each key displayed in the proximity of the selected key to indicate the likelihood that another key was the intended key.

Figure 9:
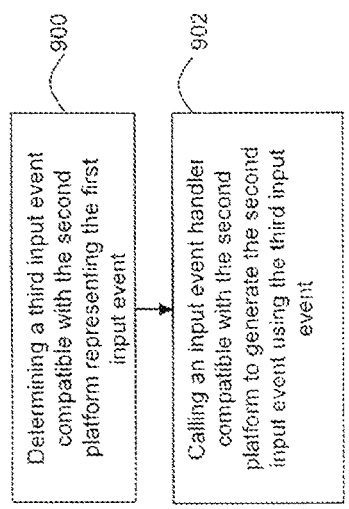
FIG. 9 is a flow diagram of example computer executable instructions for determining a second input event using an input event handler.

In an example embodiment, the probabilistic information can be determined by an input event handler developed for the same platform as the second input event (i.e. the second platform). Referring to FIG. 9, an example set of computer executable or processor implemented instructions is provided for determining a second input event as performed at block 802. At block 900, a third input event compatible with the second platform representing the first input event is determined. In an example embodiment, a mediator module is used to determine the third input event. At block 902, an input event handler compatible with the second platform is called to generate the second input event using the third input event. In an example embodiment, the input event handler is called by a mediator module.

As noted above, a third input event representing the first input event is determined at block 900. The third input event is compatible with a second platform that is to be used to run an input event handler. The first input event is converted to the third input event so that information in the first input event can be understood by the input event handler. The third input event can be determined by mapping data fields in the first input event to a corresponding data field in the third input event, or deriving a data field of the third input event from one or more data fields from the first input event. In an example configuration, block 900 may be implemented by the convert input event module 704 in communication with a mapping storage 316 (FIG. 7).

At block 902, an input event handler compatible with the second platform is called to generate the second input event using the third input event. In an example configuration, block 902 may be implemented by the convert input event module 704 instructing the apply input event hander module 714 to apply one or more input event handlers stored in the input event handler storage 718 (FIG. 7).

In an example embodiment, an input event handler can add probabilistic information to the third input event to generate the second input event. For example, the input event handler can use historical information to predict the likelihood that a deletion will occur immediately proceeding one or more selected keys and the most likely key replacement. Such information can be added to the third input event as new data fields to generate the second input event. The additional data fields in the second input event can then be used by an input method to determine that the key selected by the touch 112 is the intended key as predicted by the input method, as opposed to the key displayed closest to the touch 112 on the virtual keyboard 110.

Referring back to FIG. 8, at block 804, at least one input method compatible with the second platform is called to generate an input method event based on the second input event. In an example configuration, block 804 may be implemented by the select input method module 706 by receiving the second input event from the convert input event module 704 and instructing the apply input method module 708 to apply one or more input methods stored on the input methods storage 710 to the second input event. In one example embodiment, the second input event can be applied to a plurality of input methods in series. For example, a first input method in the series can be applied to the second input event to generate a first input method event. A second input method proceeding the first input method in the series can then be applied to the first input method event to generate a second input method event and so on until all the input methods in the series is applied. In an example configuration, the select input method module 708 (FIG. 7) can receive one or more intermediary input method events before calling the next input method in the series. In another example embodiment, the select input method module 706 can analyze the second input event or an intermediary input method event in order to select a suitable input method to be applied.

In another example embodiment, one or more input methods can be concurrently applied to the second input event to generate one or more input method events.

In another example embodiment, the second input event may be processed by an input event handler prior to being applied to one or more input methods. In an example configuration of FIG. 7, the apply input method module 708 can send the second input event or an intermediary input method event to the apply input event handler module 714 and call the apply input event handler module 714 to apply an input event hander stored in the input event handler storage 718 to the second input event or an intermediary input method event.

At block 806, the one or more instructions compatible with the first platform is determined based one or more input method events. In an example configuration, block 806 may be implemented by the translate input method event module 720 (FIG. 7) in conjunction with the mapping storage 716. The mapping storage 716 can include mapping information to map one or more data and/or actions of the input method event to instructions that are compatible with the first platform and that can be understood by an application 339 running on the first platform such as the operating system 334.

As noted above, in an example embodiment, one or more of blocks 802 (including blocks 900 and 902), 804 and 806 can be performed by a mediator module. In an example configuration of FIG. 7, the mediator module can be represented by the mediation layer 720 and includes the modules described therein. In another example embodiment, the mediator module can include one or more of the mapping storage 716, convert input event module 704, select input method event module 706 and translate input method event module 712.

It will be appreciated that a first platform can differ from a second platform by being different operating systems, using different programming languages and/or using different data structures, for example. In an example configuration of FIG. 7, the modules in the proprietary layer 730 can be run on a virtual machine of the second platform within the first platform of the mobile device 100.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific example embodiments, various modifications thereof will be apparent to those skilled in the art as outlined in the appended claims.

The invention claimed is:

1. An electronic device comprising:
   a first operating system utilizing an open source framework;
   an input interface receiving input from a user of the electronic device;
   an input method software component loaded onto the electronic device, the input method software component converting an input event from a first format to a second input event in a second format, the input method software component partitioned into two layers: a proprietary layer and a mediation layer;
   wherein the proprietary layer is inaccessible to the first operating system, such that the proprietary components are hidden from the first operating system and not considered as part of the open-source framework, the proprietary layer having stored therein the following proprietary components:
   input methods storage comprising one or more input methods, wherein an input method configures the electronic device to receive input from the user, wherein the one or more input methods stored in the proprietary layer are compatible with a second operating system different from the first operating system and are incompatible with the first operating system;
   an input event handler called by the mediation layer and compatible with the second operating system, the input event handler determining probability information indicating a likelihood that the user input selected an intended key and adding the probability information to the second input event;
   an apply input method module calling at least one input method of the one or more input methods stored in the proprietary layer, the at least one input method executing within a virtualized computing environment of the electronic device comprising the second operating system, the at least one input method using the probability information added to the second input event for generating an input method event based on the second input event, the input method event comprising one or more instructions to be performed by the electronic device according to the input method, wherein the at least one input method event and the one or more instructions are incompatible with the first operating system and compatible with the second operating system; and
   wherein the mediation layer interfaces between the first operating system and the proprietary layer, the mediation layer forming a barrier separating components of the proprietary layer from the first operating system such that the first operating system is unable to access the input methods and the input event handlers in the proprietary layer, the mediation layer having stored therein the following components:
   a convert input event module detecting the first input event of a format compatible with the first operating system and incompatible with a target application running on the first operating system, wherein an input event describes a user input in a predetermined format understandable by an input method, and determining that the first input event is to be handled by at least one input method of the one or more input methods stored in the proprietary layer;
   a select input event module determining the second input event representing the first input event, the second input event generated from an input method not designed for the first operating system and not able to directly instruct the first operating system, the second input event being compatible with the input method and the second operating system, the second input event being determined using the mediation layer interfacing between the first operating system and the proprietary layer, and wherein the second input event is of a same input type as the first input event;
   a mapping storage module storing mapping information to map data and actions of the input method event to instructions that are compatible with the first operating system and can be understood by the target application running on the first operating system; and
   a translate input event module accessing the mapping storage module to translate the input method event into a set of instructions compatible with the first operating system, the set of instructions being executable by the target application running on the first operating system at the electronic device.

2. The electronic device of claim 1 wherein the apply input method module calls the at least one input method by applying the second input event to a plurality of input methods in series.

3. The electronic device of claim 1 wherein the input interface comprises a touch-sensitive display.

4. The electronic device of claim 3 wherein the first input event is generated in response to a user touch.

5. The electronic device of claim 4 wherein the first input event is generated in response to the user touch on a virtual keyboard displayed on a touch-sensitive display.

6. The electronic device of claim 4, wherein the first input event and the second input event represent user touch inputs on a given key of a touch-sensitive display.

7. The electronic device of claim of claim 4, wherein the probability information comprises a probability value associated with each key within a proximity of the given key to indicate a likelihood that another key was the intended key.

8. The electronic device of claim 1 wherein the electronic device is a mobile two-way communication device.

9. The electronic device of claim 1 wherein the electronic device is a kiosk and the input interface is a wall-mounted screen.

10. The electronic device of claim 1 wherein the input method software component is pre-installed on the electronic device.

11. The electronic device of claim 1 wherein the input method software component is installed on the electronic device after manufacture of the electronic device.

* * * * *